United States Patent [19]

Matsumoto

[11] Patent Number: 5,716,173
[45] Date of Patent: Feb. 10, 1998

[54] TOOL HOLDER

[75] Inventor: Masakazu Matsumoto, Higashi-Osaka, Japan

[73] Assignee: Nikken Kosakusho Works, Ltd., Higashi-Osaka, Japan

[21] Appl. No.: 646,264

[22] PCT Filed: Sep. 20, 1995

[86] PCT No.: PCT/JP95/01903

§ 371 Date: May 20, 1996

§ 102(e) Date: May 20, 1996

[87] PCT Pub. No.: WO96/09909

PCT Pub. Date: Apr. 4, 1996

[30] Foreign Application Priority Data

Sep. 26, 1994 [JP] Japan ................... 6-229971
Sep. 26, 1994 [JP] Japan ................... 6-229972
Oct. 6, 1994 [JP] Japan ................... 6-243090

[51] Int. Cl.[6] ................................................ B23C 9/00
[52] U.S. Cl. ........................................ 408/239 A; 409/234
[58] Field of Search ......................... 408/238, 238 A, 408/239 R; 409/234, 232

[56] References Cited

U.S. PATENT DOCUMENTS

| | | | |
|---|---|---|---|
| 2,356,835 | 8/1944 | Duckett | 408/238 |
| 3,554,080 | 1/1971 | Herrmann | 408/238 |
| 4,576,058 | 3/1986 | Matumoto . | |
| 4,655,631 | 4/1987 | Mitchell | 409/232 X |
| 4,840,520 | 6/1989 | Pfalzgraf | 409/232 |
| 5,030,047 | 7/1991 | Pfalzgraf | 409/234 |
| 5,324,050 | 6/1994 | Kanaan . | |
| 5,358,360 | 10/1994 | Mai . | |
| 5,385,424 | 1/1995 | Matsumoto . | |
| 5,507,587 | 4/1996 | Matsumoto . | |

FOREIGN PATENT DOCUMENTS

| | | | |
|---|---|---|---|
| 34 36 733 | 4/1986 | Germany . | |
| 35 04 905 | 8/1986 | Germany . | |
| 87 15 314 | 2/1988 | Germany . | |
| 3725759 | 12/1988 | Germany | 408/238 |
| 0263484 | 1/1989 | Germany | 408/239 A |
| 92 01 112 | 4/1993 | Germany . | |
| 63-53605 | 4/1988 | Japan . | |
| 476885 | 12/1937 | United Kingdom . | |

*Primary Examiner*—Daniel W. Howell
*Assistant Examiner*—Henry W. H. Tsai
*Attorney, Agent, or Firm*—Oblon, Spivak, McClelland, Maier & Neustadt, P.C.

[57] ABSTRACT

A tool holder includes a sleeve to be fitted into a tapered bore of a main spindle of a machine tool, a shank portion inserted into the sleeve so as to be axially movable relative to the sleeve, a flange formed integrally with the shank portion which abuts an end face of the main spindle and an elastic device placed between the flange and the sleeve. The sleeve is formed with a slit which extends axially through a portion of the peripheral wall. The slit is provided with an elastic device.

20 Claims, 12 Drawing Sheets

TOOL HOLDER

BACKGROUND OF THE INVENTION

1. Field of the Invention

The present invention relates to a tool holder to be detachably attached to the main spindle of a machine tool and to a technique for facilitating operations of attaching and detaching the tool holder.

2. Discussion of the Background

In a machine tool such as a machining center there is provided an automatic tool changing device which allows a tool holder holding a tool to be detachably attached to the main spindle of the machine tool and to be changed for an alternative. The tool holder attached to the main spindle is bound with the main spindle by contact at one portion between a tapered bore of the main spindle and a tapered surface of the shank portion of the tool holder. The contact between the tapered bore and the tapered surface is strengthened by pulling means provided within the main spindle for axially inwardly pulling the tool holder, whereby the tool holder is firmly secured to the main spindle. The bond strength (bond rigidity) between the main spindle and the tool holder will influence the machining precision of the machine tool. If the bond rigidity is low, the contact portion cannot withstand heavy cutting work or high speed rotation thereby causing chatter or vibration and collapse or run-out of the tool to occur.

To enhance the bond rigidity, the pulling force of the pulling means is required to increase. However, the increase in the pulling force of the pulling means is limited.

Known as a tool holder adapted to enhance the bond rigidity without increasing the pulling force is that described in, for example, Japanese Utility Model Publication No. SHO 63-53605.

This conventional tool holder comprises a sleeve to be fitted into the tapered bore of the main spindle of a machine tool, a shank portion inserted into the sleeve so as to be axially movable relative to the sleeve, a flange portion formed integrally with the shank potion and adapted to abut an end face of the main spindle, and an elastic member interposed between the flange portion and the sleeve. Used as the elastic member is a one-piece rubber elastic member shaped annular around the shank portion or a disc spring assembly in which a plurality of disc springs are combined as alternately orienting reverse to each other.

The conventional tool holder is detachably attached to the tapered bore of the main spindle of the machine tool by causing an arm of an automatic tool changing device to grip a circumferential groove portion formed in the outer periphery of the flange portion. Upon this attachment, a tapered surface of the outer periphery of the sleeve is fitted into the tapered bore of the main spindle with a predetermined clearance defined between the end face of the main spindle and the end face of the flange portion.

The tool holder is then pulled inwardly of the main spindle by pulling means provided in the main spindle, so that the flange end face is brought into contact with the end face of the main spindle. At this time the sleeve is pressed by the elastic member to strengthen the bonding of the sleeve to the tapered bore of the main spindle. At the same time therewith, the inner diameter of the sleeve is reduced to strengthen the bonding between the sleeve and the shank portion.

Thus, the conventional tool holder is intended obtain a bond rigidity more firm than that of a tool holder of the type to be bonded to the main spindle by contact at one portion between the tapered bore and the tapered surface with an equal pulling force by making the tool holder closely contact the main spindle of a machine tool at two portions, i.e., between the tapered bore of the main spindle of the machine tool and the tapered surface of the shank portion of the tool holder and between the end face of the main spindle and the flange end face-of-the tool holder and by strengthening the bonding of the sleeve to the shank portion.

To detach the tool holder from the machine tool in order to change the tool for an alternative, an impact is made to the rear end of the shank portion in such a direction as to remove the tool holder by the pulling means disposed in the main spindle of the machine tool. Since the conventional tool holder is constructed such that the tapered surface of the shank portion (sleeve) thereof tightly contacts the tapered bore of the main spindle of the machine tool by means of the pressing action of the elastic member, a stronger impact is required to detach the tool holder from the machine tool as the contact becomes more tight. However, there is naturally a limitation in increasing the impact made by the pulling means in the machine tool, with the result that it is difficult to detach the tool holder from the machine tool.

Further, in attaching the tool holder to the machine tool and detaching the same therefrom the sleeve is required to axially move relative to the shank portion smoothly. To this end, it is necessary to apply lubricating oil between the shank portion and the sleeve and to replenish the lubricating oil frequently, for example, every time the tool is changed. Thus, the handling and maintenance of the tool holder are cumbersome.

To obtain a required pressing force against the sleeve by the elastic member, the elastic member is required to be compressed by an increased amount. When such a compression amount of the elastic member is increased, enlarged clearance results between the end face of the main spindle and the flange end face upon the attachment of the tool holder to the main spindle by the automatic tool changing device. This requires the pull-in amount by the pulling means to increase. Conventionally, such a pull-in amount is set to about 3 mm.

Such an increased pull-in amount as above causes the tool changing arm holding the tool holder to be largely deflected, which sometimes leads to a cause of damage to the automatic tool changing device. In addition, the time period required for a tool change is problematically prolonged with an increasing pull-in amount.

Since the elastic member is to be subjected to elastic deformation by such a large pull-in amount, it is a conventional practice to provide a predetermined circumferential gap between the inner periphery of the elastic member in its uncompressed condition and the outer periphery of the shank portion. This circumferential gap remains even when the elastic member assumes its compressed condition and, hence, induces the elastic member to move eccentrically thereby causing vibration when the main spindle rotates at high speed.

It is, therefore, an object of the present invention to provide a tool holder which is capable of being easily and assuredly attached to and detached from a machine tool in changing the tool held by the tool holder for an alternative or in like operations, which prevents damage to an automatic tool changing device while enabling the tool to be changed in a shortened period of time, which includes an elastic member exhibiting a sufficient biasing force against a sleeve even with a reduced compression amount, and which prevents a circumferential gap from appearing when the elastic member is in its compressed condition, whereby the foregoing problems are solved.

SUMMARY OF THE INVENTION

To attain the foregoing object, the present invention provides the following technical means.

Specifically, a tool holder according to the present invention comprises a sleeve to be fitted into a tapered bore of a main spindle of a machine tool, a shank portion inserted into the sleeve so as to be axially movable relative to the sleeve, a flange portion formed integrally with the shank portion and adapted to abut an end face of the main spindle, and an elastic member interposed between the flange portion and the sleeve, wherein the sleeve is formed with a slit portion axially extending through a portion of a peripheral wall thereof, the slit portion being provided therein with an elastic element.

In the present invention it is possible to provide a lubricant sealing portion opened in the shank portion as immediately facing the inner periphery of the sleeve so as to eliminate the need of replenishing a lubricant over a prolonged time period.

To facilitate the securing of the tool holder by the pulling action of tool holder pulling means, the present invention allows preloading means to be provided for preloading the elastic member to make constant the distance between the sleeve and the flange portion in an assembled condition.

In the present invention the elastic member may be shaped annular as comprising at least one combination of a compressible element formed of an elastic material and a non-compressible element formed of a rigid material which are axially joined together, so as to reduce the compressible amount thereof and provide an increased sleeve-pressing force.

Further, in the present invention the elastic member may be shaped annular as having inner periphery abutting the outer periphery of the shank portion, so as to prevent the occurrence of vibration at high speed rotation.

Furthermore, to prevent the occurrence of vibration at high speed rotation more effectively, the elastic member may be shaped annular and accommodated in an annular recess formed in the flange portion while having outer and inner peripheries adapted to abut the outer and inner peripheries of the annular recess when the flange portion abuts the end face of the main spindle.

The tool holder of the present invention is adapted to be gripped by the arm of an automatic tool changing device and to be detachably attached to the tapered bore of the main spindle of a machine tool, like a conventional one. Upon attaching the tool holder, the tapered surface of the outer periphery of the sleeve is fitted into the tapered bore of the main spindle, forming a predetermined clearance between the end face of the main spindle and the end face of the flange portion.

Then, the tool holder is pulled inwardly of the main spindle by pulling means provided in the main spindle, so that the end face of the flange portion come into contact with the end face of the main spindle. At this time the elastic member presses the sleeve to strengthen the bonding thereof to the tapered surface of the main spindle, while the inner diameter of the sleeve is reduced to strengthen the bonding of the sleeve to the shank portion.

After the completion of the process of attaching the tool holder, the holding of the tool holder by the arm of the automatic tool changing device is released.

According to the present invention, the sleeve is formed with the slit portion axially extending through a portion of the peripheral wall of the sleeve, and the elastic element is provided in the slit portion. With this feature, when the tool holder is pulled inwardly of the main spindle, the diameter of the sleeve is reduced with the elastic element in the slit portion being compressed, and when the tool holder is in its attached condition the elastic element constantly gives the sleeve a biasing force such as to increase the diameter thereof. Further, since the slit portion is filled with the elastic element, penetration of swarf and dust through the slit portion is prevented.

By virtue of the above feature, when an impact is made on the rear end of the shank portion of the tool holder by the pulling means so as to detach the tool holder from the machine tool, the biasing force to increase the diameter of the sleeve aids the action of pressing the sleeve out of the tapered bore of the main spindle thereby facilitating and ensuring the detachment of the tool holder.

If the shank portion is provided with the lubricant sealing portion opened as immediately facing the inner periphery of the sleeve, a lubricant (lubricating oil or the like) is always retained between the shank portion and the sleeve, resulting in no need to replenish the lubricant over a long period of time.

By providing the preload means for preloading the elastic member to make constant the distance between the sleeve and the flange portion in an assembled condition it is possible to cause the elastic member to be compressed by a constant amount, so that the tool holder is readily secured to the machine tool by the pulling means.

Where the elastic member is shaped annular as comprising at least one combination of compressible element and noncompressible element which are axially joined together, the elastic member offers a reduced compressible amount and an enhanced pressing force against the sleeve as compared to an elastic member entirely composed of an elastic rubber element or an assembly of disc springs if such elastic members have an equal overall thickness.

Consequently, due to the elastic member to be compressed by a small amount the pulled-in amount of the flange portion up to a point where the end face of the flange portion abuts the end face of the main spindle is decreased whereby the tool changing arm is less deformable upon the automatic tool changing and the time required for the tool changing is shortened.

If the elastic member is shaped annular having an inner periphery abutting the outer periphery of the shank portion, run-out of the elastic member will not occur even at high speed rotation thereby preventing the occurrence of vibration at high speed rotation.

Further, if the elastic member is shaped annular and accommodated in an annular recess formed in the flange portion while having outer and inner peripheries adapted to abut the outer and inner peripheries of the annular recess, respectively, when the flange portion abuts the end face of the main spindle, the elastic member is prevented from run-out from the inner and outer peripheries of the annular recess when the main spindle is rotated at high speed, so that the occurrence of vibration at high speed rotation is prevented more efficiently.

DESCRIPTION OF THE PREFERRED EMBODIMENTS

Embodiments of the present invention will now be described with reference to the drawings.

Figure 1:
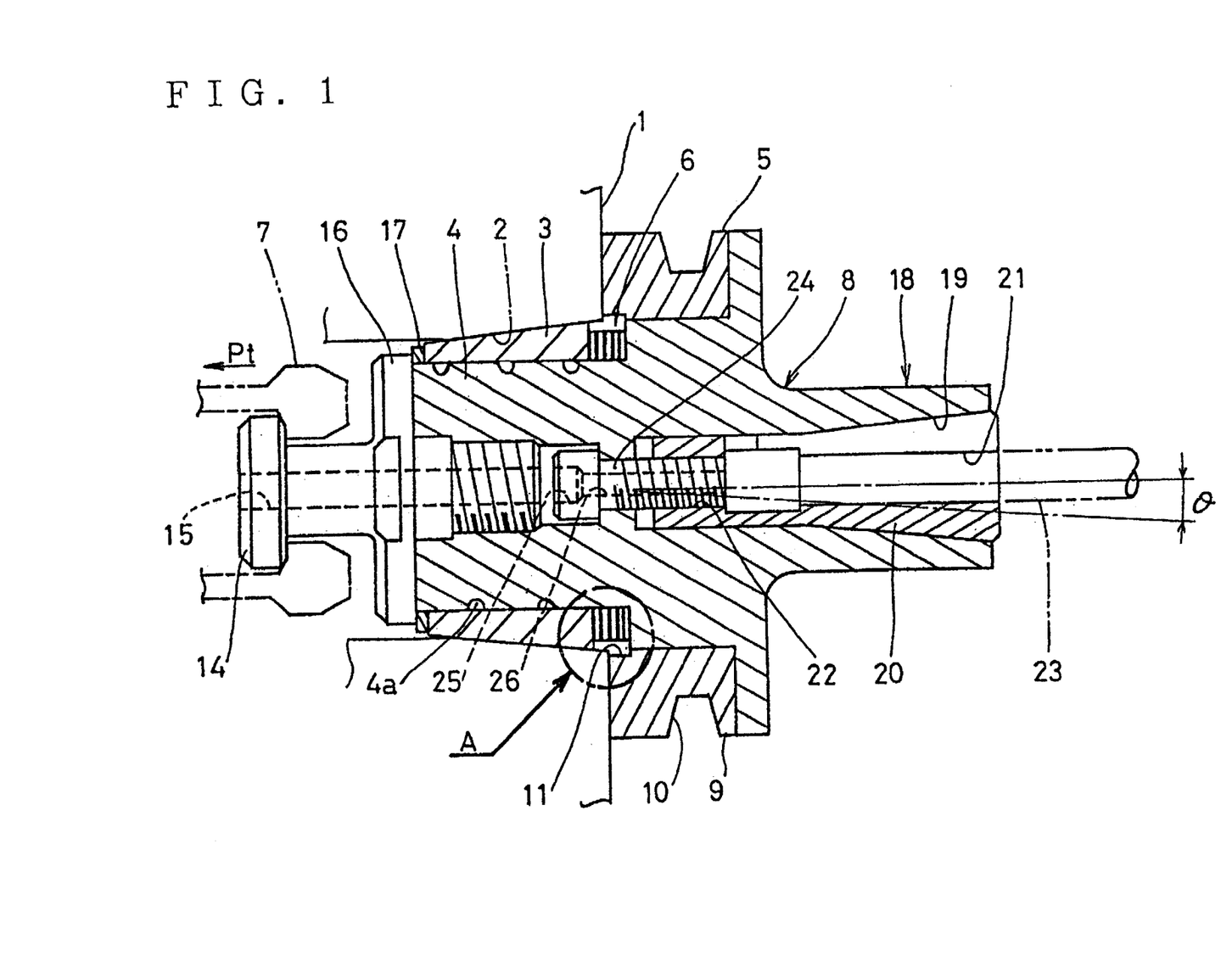
FIG. 1 is a side view in section showing an embodiment of the present invention.

Referring to FIG. 1, a tool holder according to the present invention includes a sleeve 3 fitted into a tapered bore 2 of a main spindle of a machine tool, a shank portion 4 inserted into the sleeve 3 so as to be movable relative to the sleeve 3, a flange portion 5 formed integrally with the shank portion 4 and abutting the end face of the main spindle 1, and an elastic member 6 interposed between the flange portion 5 and the sleeve 3.

In the main spindle 1 of the machine tool is provided pulling means 7 for pulling the tool holder fitted in the tapered bore 2 of the main spindle 1 further into the main spindle 1. The main spindle 1 is also provided with a coolant supply device (not shown) for supplying a coolant to the tapered bore 2 and a compressed air supply device (not shown) for supplying cleaning air.

The sleeve 3 is cylindrical having an outer periphery comprising a tapered surface and an inner periphery comprising an untapered surface.

The sleeve 3 has a slit portion 3a axially extending through a portion of the peripheral wall of the sleeve 3. This slit portion 3a has a gentle inclination in the axial direction. In the slit portion 3a is provided a diameter-enlarging bias material 3b (elastic element) formed of silicone, nylon, rubber or other elastic material. Thus, a biasing force is always exerted on the sleeve 3 to enlarge the diameter thereof. In this embodiment the diameter-enlarging bias material 3b is positioned in the slit portion 3a on the deeper side thereof so as to define in the outer periphery of the sleeve 3 a groove axially extending over the entire length of the slit portion 3a. Nevertheless, the slit portion 3a may be fully filled with the bias material 3b.

The taper angle of the tapered outer periphery of the sleeve 3 is made equal to that of the tapered bore 2 of the main spindle 1. This taper angle is equal to or smaller than an inclination of 7/24 (about 16°) which is typically employed, preferably equal to or smaller than 12°. This embodiment employs an inclination of 1/10 (about 6°).

The shank portion 4 is formed in one end portion of the holder body 8 and has an outer periphery having an untapered surface axially slidably close-fitted in the inner periphery of the sleeve 3.

The shank portion 4 has a lubricant sealing portion 4a in the form of a groove helically extending around the outer periphery of the shank portion 4. For this reason the lubricant sealing portion 4a is opened as immediately facing the inner periphery of the sleeve 3 when the shank portion 4 is fitted in the sleeve 3, thus allowing a lubricant (lubricating oil, grease or the like) to be sealed therein. The lubricant thus sealed in the lubricant sealing portion 4a will not be so reduced as to cause problems in its function or run out unless the sleeve 3 is removed from the shank portion 4, thereby being retained over a prolonged time period.

The flange portion 5 is located contiguous to the shank portion 4 and is larger in diameter than the shank portion 4. The flange portion 5 may be formed by joining a separately-formed ring body 9 integrally with the holder body 8 through shrink fit or the like. In the outer periphery of the flange portion 5 is circumferentially formed a V-shaped fit groove 10 to receive the tool changing arm (not shown) of an automatic tool changing device.

The end face of the flange portion 5 on the side adjacent the shank portion comprises a flat surface to be brought into face contact with the end face of the main spindle 1 of the machine tool. An elastic member mounting seat 11 is formed in the flat surface of the flange portion 5 on the side adjacent the inner periphery thereof. The mounting seat 11 comprises an annular recess formed in the flat surface.

Figure 3:
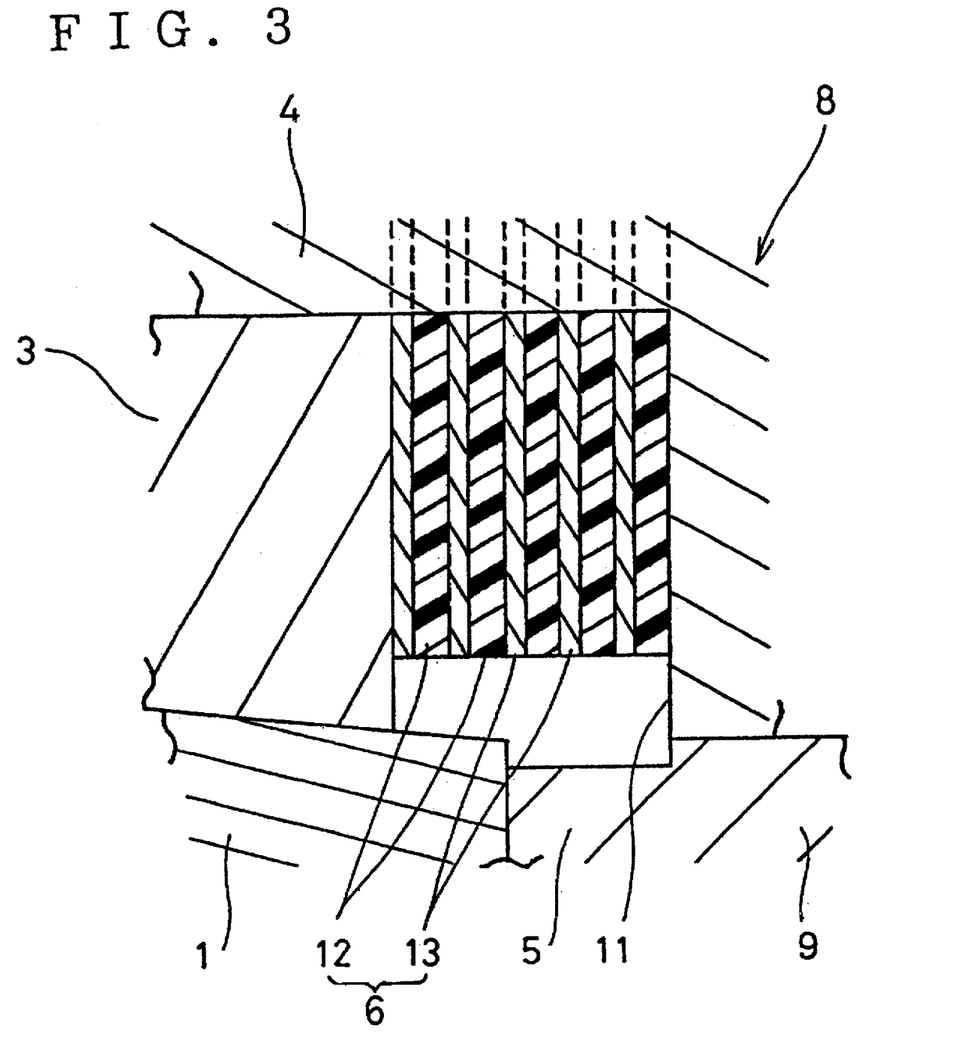
FIG. 3 is an enlarged view of portion A shown in FIG. 1.

As shown in FIG. 3, the elastic member 6 which is shaped annular is received in the recess of the mounting seat 11 and abuts the end face of the sleeve 3. The inner periphery of the annular elastic member 6 closely contacts the outer periphery of the shank portion 4, while the outer periphery of the elastic member 6 is spaced by a predetermined gap from the outer periphery of the recess of the mounting seat 11. Thus, when the flange portion 5 abuts the end face of the main spindle 1, the inner and outer peripheries of the annular elastic member 6 abut the inner and outer peripheries of the annular recess 11 (mounting seat), respectively.

The elastic member 6 comprises a compressible element 12 formed of an elastic material and a noncompressible element 13 formed of a rigid material which are axially joined together with no clearance therebetween.

The compressible element 12 is formed of an elastic material such as a soft urethane resin, rubber, a fluorine-type soft resin or other type of soft resin, or other synthetic rubber. In the present embodiment the thickness of the compressible element 12 is 1 mm.

The noncompressible element 13 is formed of a rigid material such as a metal plate, for example, a steel sheet. In this embodiment the thickness of the noncompressible element 13 is 0.2 mm.

In the present embodiment the elastic member 6 comprises five joined pairs of compressible element 12 and noncompressible element 13. Thus, the elastic member 6 is 6 mm-thick in total.

A pull stud 14 is threadingly attached to the end face of the tool holder body 8 on the shank side. The pull stud 14 has a tool insertion hole 15 centrally and axially extending therethrough. The pull stud 14 has a protuberant portion 16 having a diameter larger than the outer diameter of the shank portion 4, the protuberant portion 16 blocking the sleeve 3 from slipping off. Between the protuberant portion 16 and the sleeve 3 is interposed preloading means 17.

The preloading means 17 acts to preload the elastic member 6 so as to make constant the distance between the end face of the sleeve 3 and the flat surface of the flange portion 5 in an assembled condition. In this embodiment the preloading means 17 comprises a plurality of spacers.

By adjusting the thickness of the spacers a variation in the thickness of the elastic member 6 is rectified, so that the distance between the sleeve end face and the flat surface of the flange portion 5 in an assembled condition is made constant.

On the side opposite the shank portion across the flange portion 5 in the holder body 8 is formed a tool holding portion 18 protruding forward from the flange portion 5. In the tool holding portion 18 is concentrically formed a collet holding bore 19 which opens in the front end face of the tool holding portion 18. The collet holding bore 19 comprises a gently tapered surface and is adapted to receive a tapered collet 20 therein. The tapered collet 20 has a tool holding bore 21 concentrically formed on its front end side and an internal thread portion 22 concentrically formed on its rear end side. A cutting tool 23 such as an end mill or a drill is removably held in the tool holding bore 21 by insertion.

In an axially central portion of the tool holder 8 is rotatably held a draw bolt 24 with its axial movement restrained. The draw bolt 24 has a thread portion threadingly engaging the internal thread portion 22 of the tapered collet 20. The head portion of the draw bolt 24 has a tool engaging portion 25 in the form of a recess. Also the draw bolt 24 has a coolant supply bore 26 centrally and axially extending therethrough.

When a tool such as a hexagon wrench is inserted into the tool insertion hole 15 of the pull stud 14 and engaged with the tool engaging portion 25 of the draw bolt 24 to rotate the draw bolt 24, the tapered collet 20 is axially moved relative to the collet holding bore 19. This axial movement of the tapered collet 20 causes the tool 23 to be held or released.

With the embodiment of the above arrangement, the tool holder of the present invention attached with the tool 23 is first placed on the magazine (not shown) of the automatic tool changing device. The tool holder is then gripped by the tool changing arm of the automatic tool changing device at the fit groove 10 thereof, removed from the magazine, transferred to the main spindle 1 and attached to the tapered bore 2 of the main spindle 1.

At this time the tapered surface of the sleeve 3 of the tool holder is tightly fitted into the tapered bore 2 of the main spindle 1. In this fitted state the flat surface of the flange portion 5 of the tool holder is spaced a predetermined clearance from the end face of the main spindle 1. In this embodiment such a clearance is 0.5 mm. To make this clearance constant, the preloading means 17 acts to previously adjust the distance between the sleeve 3 and the flange portion 5 in an assembled condition.

In turn, the pulling means 7 in the main spindle 1 grips the pull stud 14 and pulls the holder body 8 inwardly of the main spindle 1. This pull-in action causes the shank portion 4 and the flange portion 5 to axially move together and this moving force is transmitted to the sleeve 3 through the elastic member 6. The difference between resistances against the moving force which are produced on the inner and outer peripheries of the sleeve 3 upon the transmission causes the inner periphery of the sleeve and the outer periphery of the shank portion to move axially relative to each other, so that the diameter of the sleeve 3 is reduced with the diameter-enlarging bias material 3b being compressed, while at the same time the elastic member 6 is compressed axially.

Thus, the flat surface of the flange portion 5 comes to abut the end face of the main spindle 1 (refer to FIG. 1).

At this time the sleeve 3 is axially pressed by the repulsion force of the elastic member 6 thus compressed. This pressing force together with the diameter-enlarging action of the diameter-enlarging bias material 3b provides a firm taper contact bond between the tapered surface of the sleeve 3 and the tapered bore 2 of the main spindle 1. Further, the clamping by the taper contact causes the inner diameter of the sleeve 3 to be reduced, hence, the sleeve 3 to grip the shank portion 4 tightly.

After the pull-in process is completed, the gripping by the tool changing arm is released, and the arm resumes its stand-by position.

In the process of attaching the tool holder according to the present embodiment the pull-in amount of the tool holder is very small, or 0.5 mm. This allows the tool changing arm to be less deformed by the pull-in operation thereby eliminating the danger of damage to the arm or the like. Further, such a small pull-in amount allows the time period required for the pull-in operation to be shortened as compared to the time period required to pull-in a conventional tool holder requiring a pulled-in amount of 3 mm.

After the attachment process is completed, the main spindle 1 of the machine tool starts rotating and the tool 23 held by the tool holder performs cutting on a workpiece. During the cutting a coolant is supplied from the coolant supply device of the main spindle 1 through the tool insertion hole 15 of the pull stud 14 and the coolant supply bore 26 of the draw bolt 24 to the tool 23.

Since the elastic member 6 comprises compressible element 12 and noncompressible element 13 axially combined without any clearance, chatter due to resonance never occur in the rotary cutting process. Further, since the elastic member 6 comprises plural pairs of compressible element 12 and noncompressible element 13 which are joined together, the elastic member 6 enjoys enhanced rigidity and vibration-damping property as compared with an elastic member comprising a single pair of compressible element and noncompressible element. Thus, the occurrence of resonance will scarcely result.

Furthermore, since the elastic member 6 is shaped annular with its inner periphery abutting the outer periphery of the shank portion 4, run-out of the elastic member 6 never occurs even at high speed rotation and, hence, the occurrence of vibration at high speed rotation is prevented.

Figure 4:
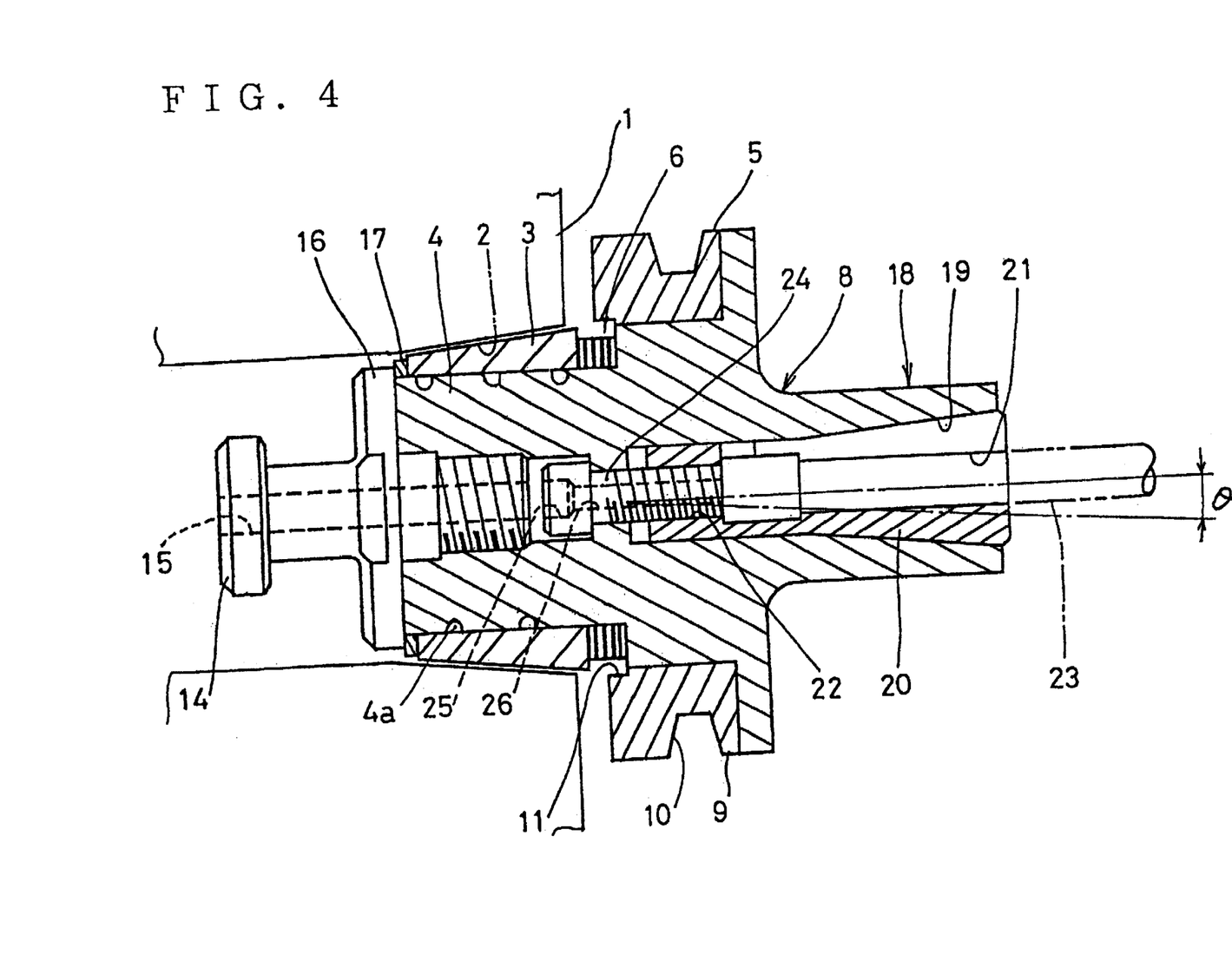
FIG. 4 is a side view in section for illustrating a state of a tool holder to be detached from a main spindle.

To detach the tool holder from the machine tool the tool changing arm of the tool changing device grips the tool holder and then the pulling means 7 releases the clamping on the pull stud 14 and makes an impact to the rear end side of the shank portion (pull stud 14).

At this time the biasing force of the diameter-enlarging bias material 3b which constantly acts to enlarge the diameter of the sleeve 3 assists the action of pushing the sleeve 3 out of the tapered bore of the main spindle 1. In addition, the sleeve 3 and the shank portion 4 are in a state such as to permit them to axially move relative to each other smoothly by virtue of the lubricant assuredly filled and retained in the lubricant sealing portion 4a, thus ensuring and facilitating the detachment of the tool holder.

Consequently, the close contact between the internal surface of the tapered bore of the main spindle 1 and the tapered surface of the sleeve 3 and between the end face of the main spindle 1 and the flange portion 5 of the tool holder is released and, hence, a gap is defined in each of the contact portions.

In this state the compressed air supply device (not shown) supplies compressed air into the tapered bore to clean each gap. The tool holder of the present embodiment is so arranged that upon application of impact to the rear end side of the shank portion, the close contact between the end face of the main spindle 1 and the end face of the flange portion 5 is released just a moment before the releasing of the close contact between the inner surface of the tapered bore of the main spindle 1 and the tapered surface of the sleeve 3. With this arrangement compressed air is permitted to pass through the slit portion 3a of the sleeve 3 (through the clearance between the diameter-enlarging bias material 3b disposed in the slit portion 3a and the inner surface of the tapered bore 2) and blow the end face of the flange 5 concentratedly, whereby the end face of the flange portion 5 is cleaned effectively.

Figure 5:
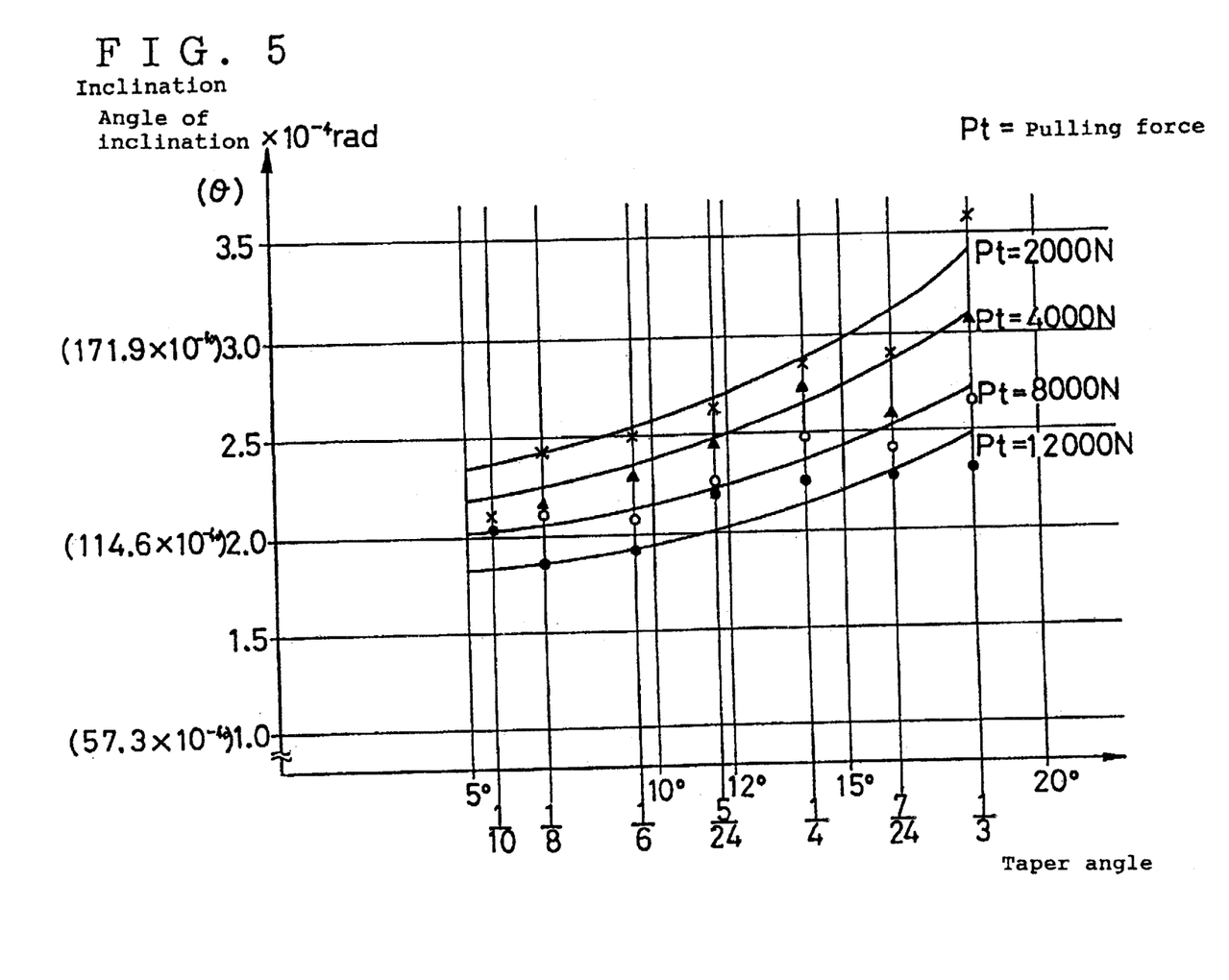
FIG. 5 is a graph of a variation in bonding rigidity with a varying taper angle at which the outer periphery of a sleeve abuts the inner periphery of a tapered bore.

With the present embodiment a high bonding rigidity was attained by setting the inclination of the taper of the sleeve as gentle as 1/10.

Specifically, as shown in FIG. 5, a test was performed to see how taper angle Tp of the sleeve 3 and pulling force Pt influenced inclination θ of the axis of the tool holder attached to the main spindle. As apparent from FIG. 5, inclination θ of the tool holder always decreased with decreasing taper angle Tp even when pulling force Pt was differently varied. Stated otherwise, the bonding rigidity was found to be more enhanced with decreasing taper angle Tp. Taper angle Tp is preferably 12° or smaller.

Figure 6:
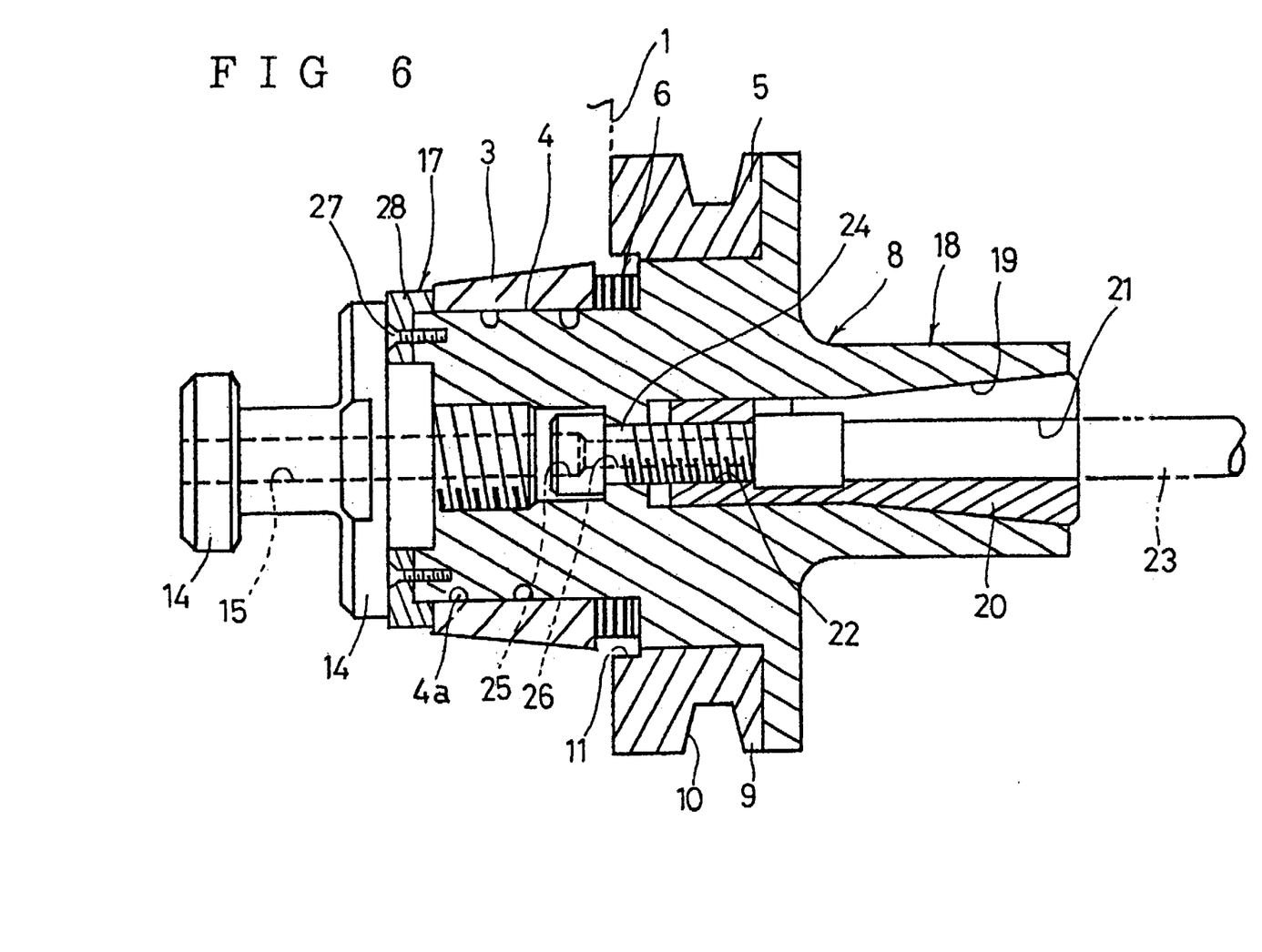
FIG. 6 is a side view in section for showing a variation of preloading means.

FIG. 6 shows another embodiment of the present invention in which preloading means 17 is different from that of the foregoing embodiment. Specifically, the preloading means 17 comprises a spacer 28 secured to the end portion of the shank portion by means of a bolt 27. By adjusting the thickness of the spacer 28 the distance between the sleeve 3 and the flange portion 5 in an assembled condition is made constant.

It should be understood that preloading means 17 is not limited to those of the foregoing embodiments but may be such as to adjust the thickness or number of noncompressible elements 13 of the elastic member 6. Otherwise, the preloading means 17 may be of an arrangement such as to make constant the distance between the sleeve 3 and the flange portion 5 in an assembled condition by combining the adjustment of the thickness or number of noncompressible elements 13 of the elastic member 6 and the adjustment of the thickness of the spacer 28.

Figure 7:
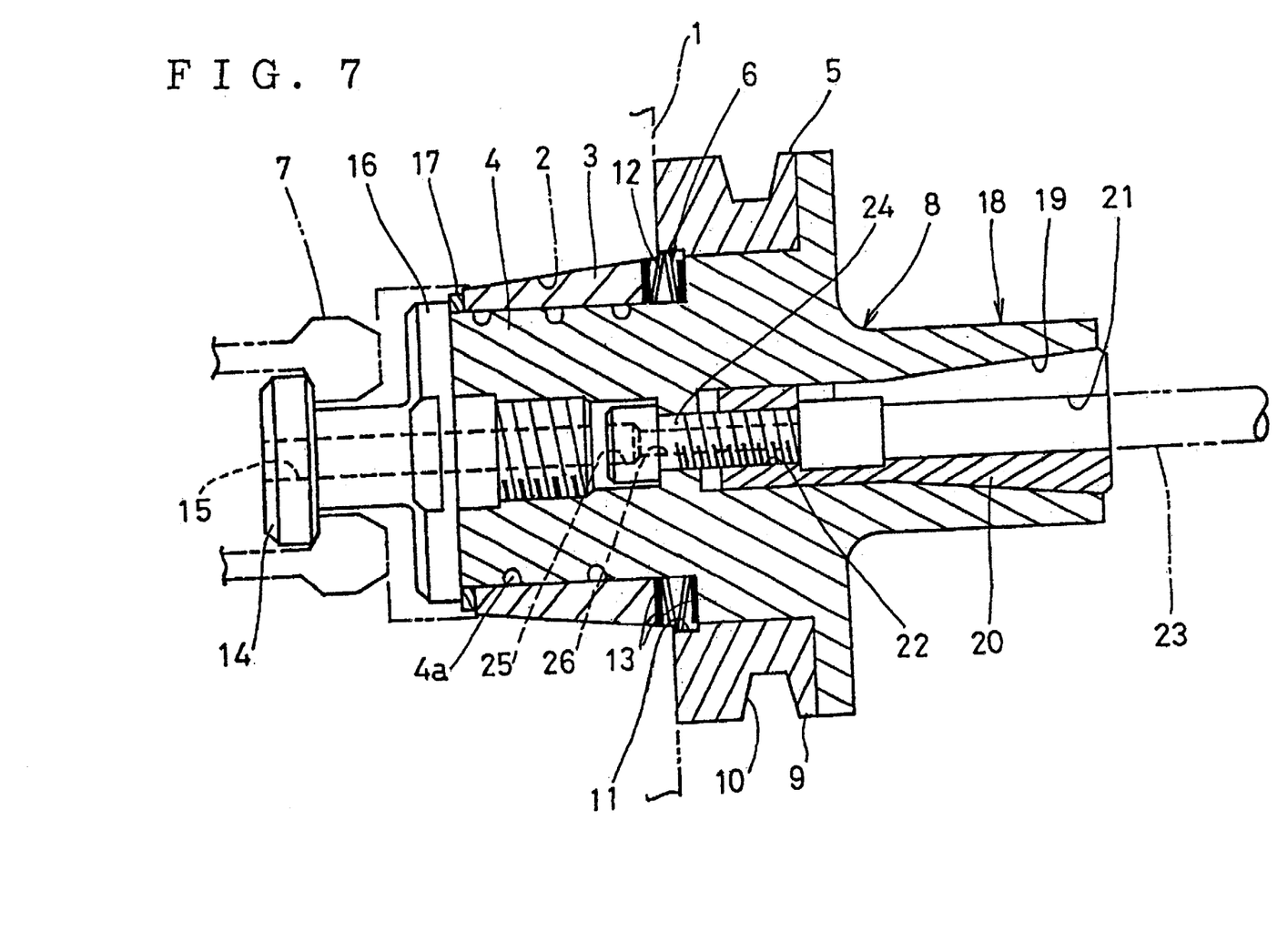
FIG. 7 is a side view in section for showing a variation of an elastic member.
Figure 8:
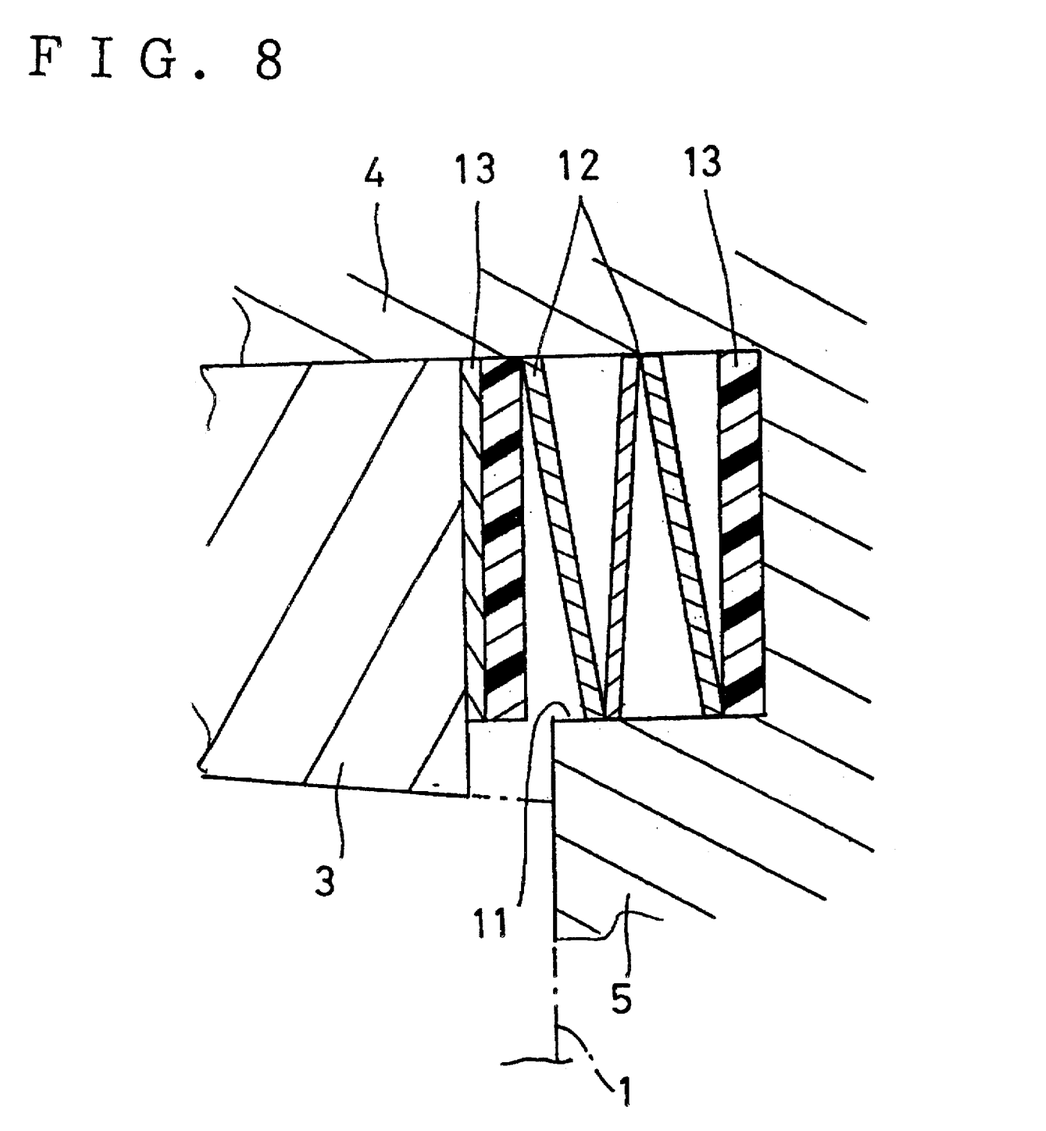
FIG. 8 is an enlarged view of the elastic member shown in FIG. 7.

FIG. 7 shows yet another embodiment of the present invention in which the constitution of the elastic member 6 is different from those of the foregoing embodiments. Specifically, the elastic member 6 comprises an assembly of compressible element 12 consisting of an annular disc spring and noncompressible element 13 consisting of a plain washer. In an uncompressed condition the compressible element 12 is elastically deformable as having a clearance from each of the inner and outer peripheries of the recess of the mounting seat 11. The compressible element 12 is sized so that the inner and outer peripheries thereof abut the inner and outer peripheries of the recess of the mounting seat 11, respectively, when the compressible element 12 is in a compressed condition where the end face of the flange portion 5 abuts the end face of the main spindle 1, as shown in FIG. 8. The noncompressible element 13 is sized so that the inner periphery thereof is closely fitted around the outer periphery of the shank portion 4 (inner periphery of the annular recess 11).

It is possible to adjust the compression amount of the compressible element 12 by selecting a noncompressible element having an appropriate thickness (or using a required number of noncompressible elements).

With this embodiment, the elastic member 6 is prevented from run-out even at high speed rotation and, hence, the occurrence of vibration at high speed rotation is prevented since the inner and outer peripheries of the compressible element 12 of the elastic member 6 abut the inner and outer peripheries of the recess of the mounting seat 11, respectively, in the rotary cutting process of the machine tool.

It should be understood that in each of the foregoing embodiments the slit portion 3a of the sleeve 3 may be formed, for example, to extend straight and parallel to the axis. Also, it is possible to form a plurality of recesses equidistantly in the outer periphery of the shank portion 4 which form the lubricant sealing portion 4a.

Figure 9:
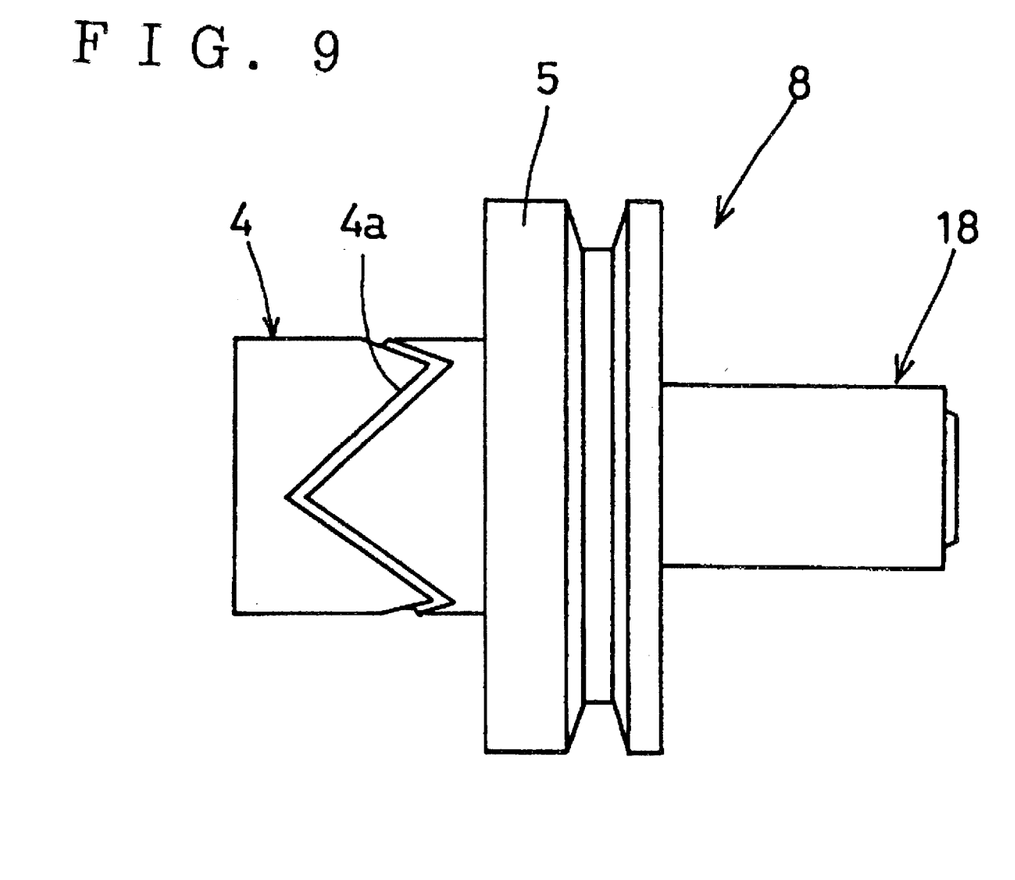
FIG. 9 is a side view in section showing another embodiment of the body of a tool holder.

The lubricant sealing portion 4a may otherwise be formed into a serrated groove continuously extending over the entire circumference of the outer periphery of the shank portion 4 as shown in FIG. 9.

Additionally, the thickness, number and the like of compressible elements 12 and noncompressible elements 13 of the elastic member 6 are not limited to those described above and can be appropriately varied depending on the diameter and application of the tool 23, the rotary speed, the pulling force and the like.

Figure 2:
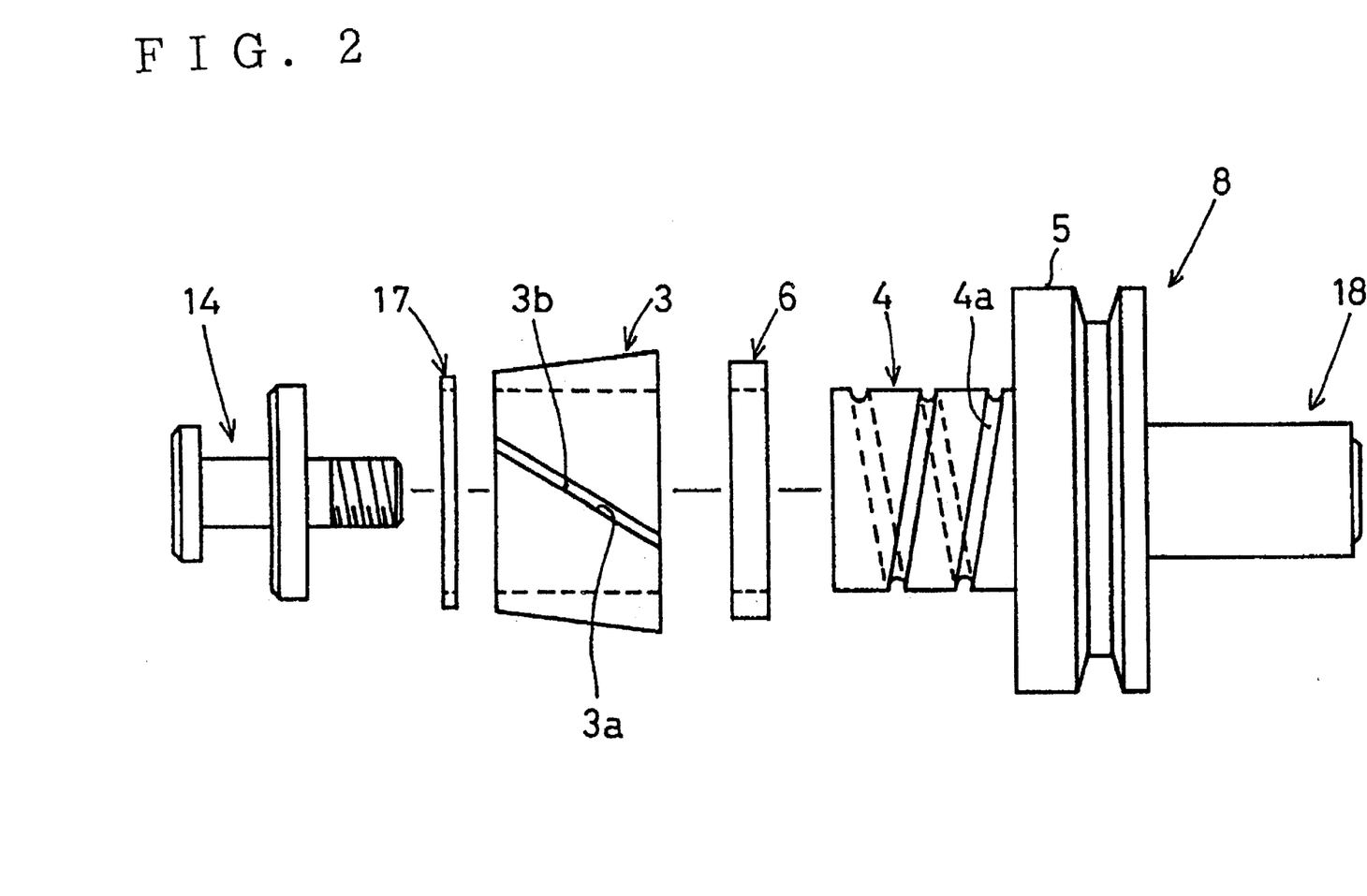
FIG. 2 is an exploded side view of a tool holder according to the present invention.
Figure 10:
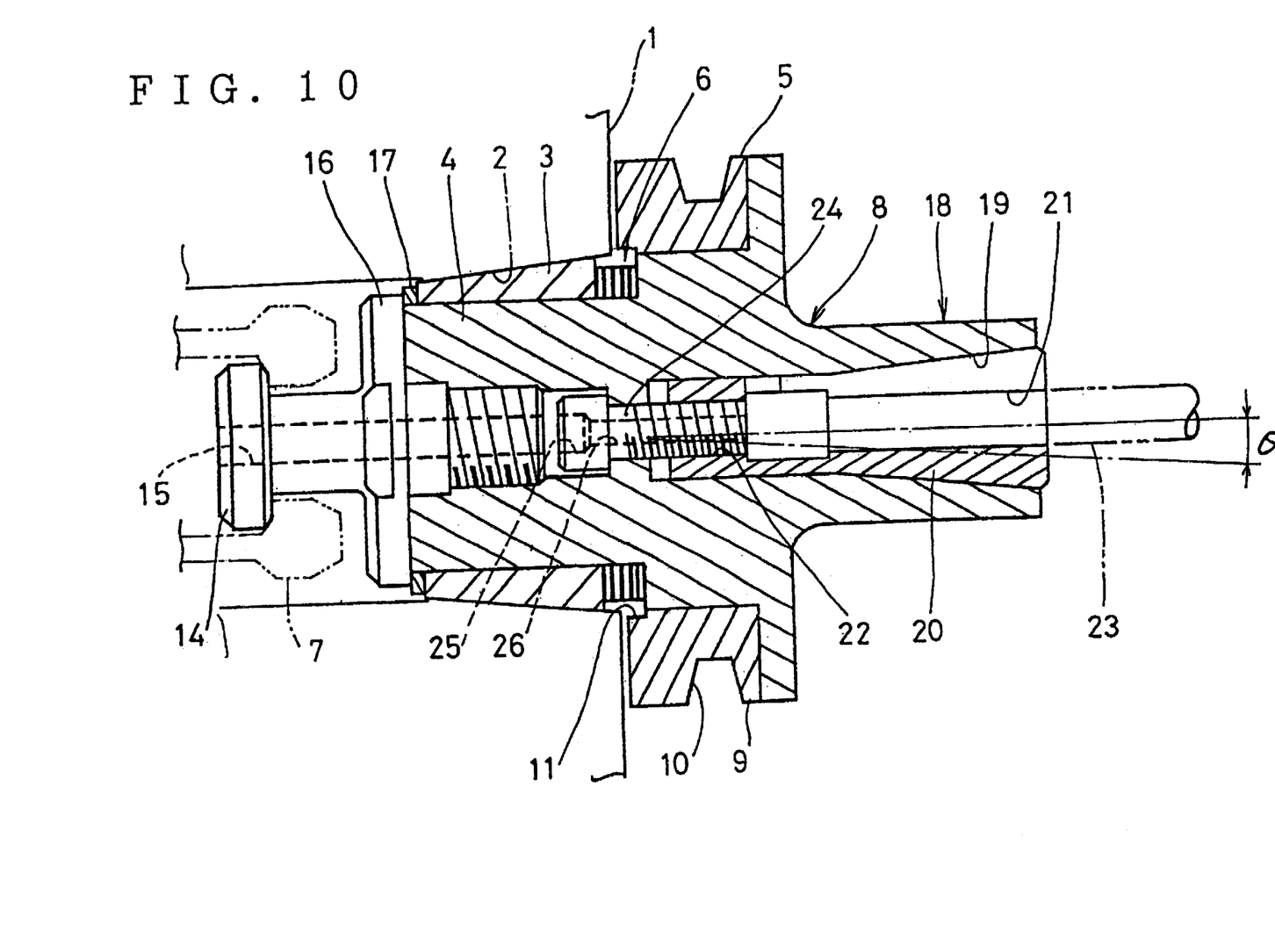
FIG. 10 is a sectional view showing yet another embodiment according to the present invention.

To attain only the object of obtaining a sufficient sleeve biasing force with the compression amount of the elastic member reduced, it is not necessary to provide the elastic element in the slit portion of the sleeve nor to provide the lubricant sealing portion in the shank portion. Shown in FIG. 10 is an embodiment to attain such an object, including sleeve 3 free of the slit portion and shank portion 4 free of the lubricant sealing portion. Other features are the same as in the embodiment shown in FIG. 2.

Figure 11:
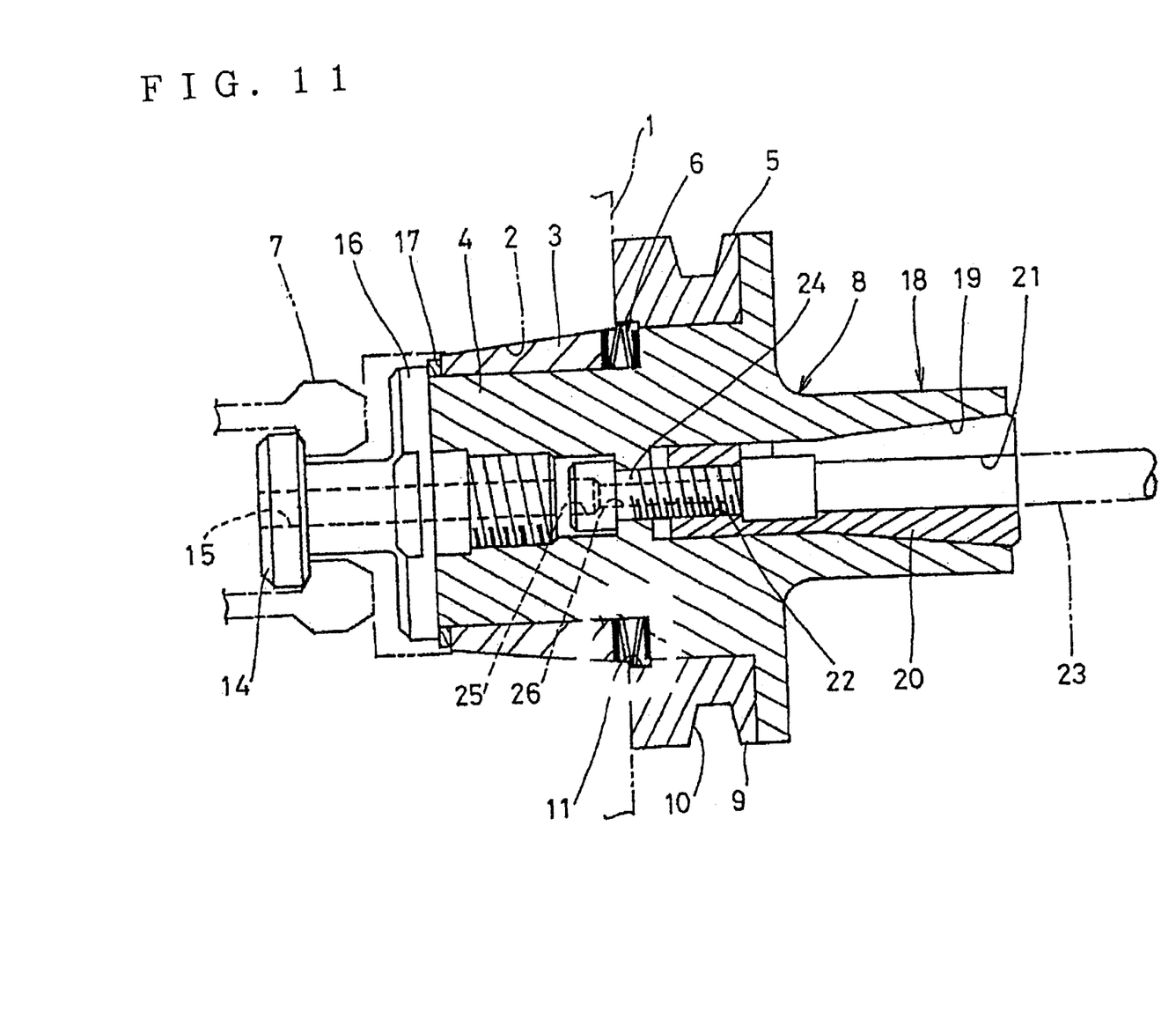
FIG. 11 is a sectional view showing still another embodiment according to the present invention.

To attain only the object of preventing run-out of the elastic member at high speed rotation, it is not necessary to provide the elastic element in the slit portion of the sleeve nor to provide the lubricant sealing portion in the shank portion. Shown in FIG. 11 is an embodiment to attain such an object, including sleeve 3 free of the slit portion and shank portion 4 free of the lubricant sealing portion. Other features are the same as in the embodiment shown in FIG. 7.

Figure 12:
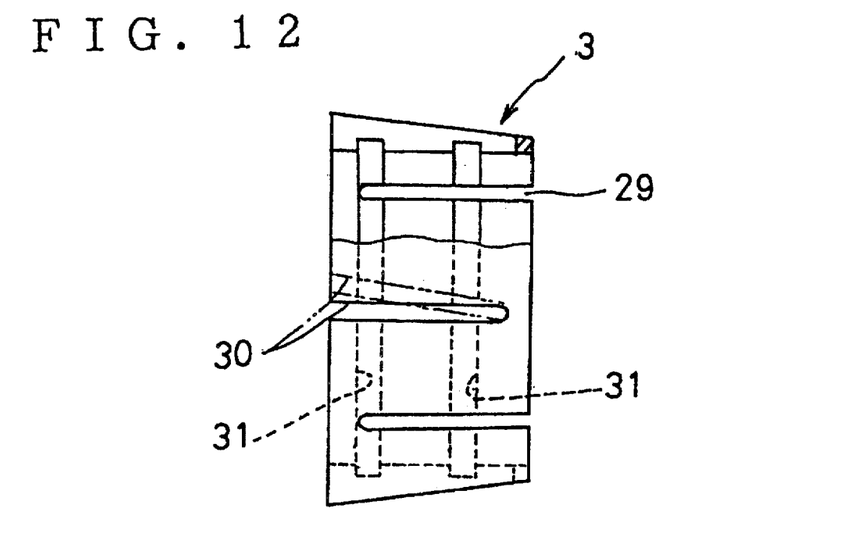
FIG. 12 shows a variation of a sleeve partially in section.
Figure 13:
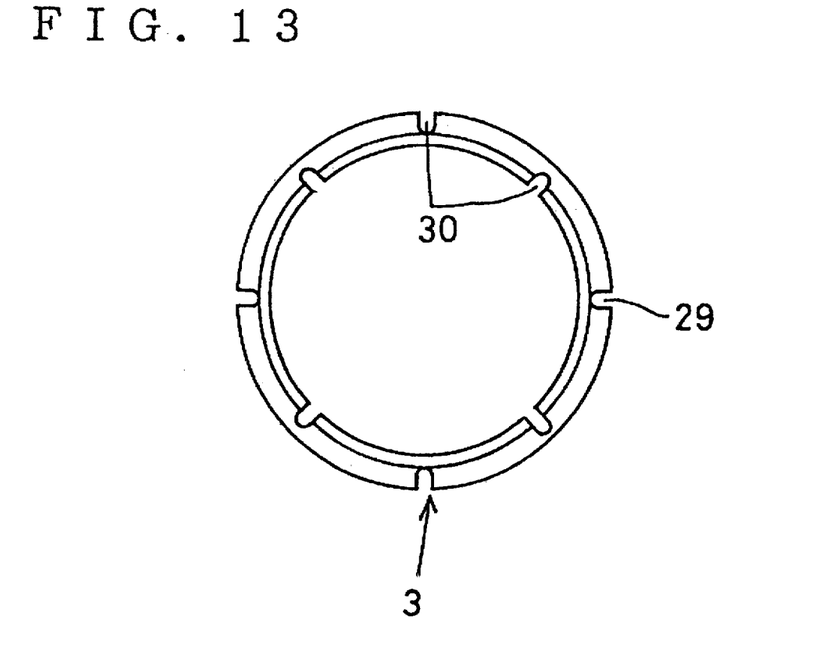
FIG. 13 is a front elevation of FIG. 12.

In the embodiments shown in FIGS. 10 and 11 the sleeve 3 shown in FIGS. 12 and 13 may be used.

The sleeve shown in FIGS. 12 and 13 has first slit 29 formed as extending from one axial end of the sleeve 3 to an axially intermediate portion of the sleeve 3 and second slit 30 extending from the other axial end of the sleeve 3 to an axially intermediate portion of the sleeve 3. Each of the slits 29 and 30 comprises a plurality of circumferentially equidistantly spaced slits. The inner periphery of the sleeve is formed with an annular groove 31, through which the first and second slits 29 and 30 axially overlap each other.

With the tool holder having the sleeve 3 with such slits, when the clamping on the pull stud 14 by the pulling means 7 is released after the tool changing arm grips the tool holder for detaching the same, the close contact between the end face of the main spindle 1 and the flange portion 5 of the tool holder is released to define a clearance therebetween as shown in FIG. 10. At this time compressed air is supplied into the tapered bore from the compressed air supply device disposed in the main spindle. Compressed air thus supplied passes through the first slit 29, annular groove 31 and then second slit 30 and spouts from the clearance between the end face of the main spindle 1 and the flange portion 5, thereby cleaning the end face of the main spindle 1.

It is to be noted that the present invention is not limited to the foregoing embodiments and may employ, for example as the sleeve 3, various sleeves described in Japanese Unexamined Utility Model Publication No. SHO 63-53605.

The present invention is applicable to a tool holder to be detachably attached to the main spindle of a machine tool.

I claim:

1. A tool holder comprising a sleeve to be fitted into a tapered bore of a main spindle (1) of a machine tool, a shank portion (4) inserted into the sleeve so as to be axially movable relative to the sleeve, a flange portion formed integrally with the shank portion and adapted to abut an end face of the main spindle, and an elastic member interposed between the flange portion and the sleeve, wherein the sleeve is formed with a slit portion axially extending through a portion of a peripheral wall thereof, the slit portion being provided therein with an elastic element.

2. A tool holder as set forth in claim 1, wherein the shank portion is provided with a lubricant sealing portion opened as immediately facing the inner periphery of the sleeve.

3. A tool holder as set forth in claim 1, further comprising preloading means for preloading the elastic member to make constant the distance between the sleeve and the flange portion in an assembled condition.

4. A tool holder as set forth in claim 1, wherein the elastic member is shaped annular as comprising at least one combination of a compressible element formed of an elastic material and a noncompressible element formed of a rigid material which are axially joined together.

5. A tool holder as set forth in claim 1, wherein the elastic member is shaped annular as having an inner periphery abutting the outer periphery of the shank portion.

6. A tool holder as set forth in claim 1, wherein the elastic member (6) is shaped annular and accommodated in an annular recess formed in the flange portion while having outer and inner peripheries adapted to abut the outer and inner peripheries of the annular recess, respectively, when the flange portion (5) abuts the end face of the main spindle.

7. A tool holder as set forth in claim 2, further comprising preloading means for preloading the elastic member to make constant the distance between the sleeve and the flange portion in an assembled condition.

8. A tool holder as set forth in claim 2, wherein the elastic member is shaped annular as comprising at least one combination of a compressible element formed of an elastic material and a noncompressible element formed of a rigid material which are axially joined together.

9. A tool holder as set forth in claim 2, wherein the elastic member is shaped annular as having an inner periphery abutting the outer periphery of the shank portion.

10. A tool holder as set forth in claim 2, wherein the elastic member is shaped annular and accommodated in an annular recess formed in the flange portion while having outer and inner peripheries adapted to abut the outer and inner peripheries of the annular recess, respectively, when the flange portion abuts the end face of the main spindle.

11. A tool holder as set forth in claim 3, wherein the elastic member is shaped annular as comprising at least one combination of a compressible element formed of an elastic material and a noncompressible element formed of a rigid material which are axially joined together.

12. A tool holder as set forth in claim 3, wherein the elastic member is shaped annular as having an inner periphery abutting the outer periphery of the shank portion.

13. A tool holder comprising a sleeve to be fitted into a tapered bore of a main spindle of a machine tool, a shank portion inserted into the sleeve so as to be axially movable relative to the sleeve, a flange portion formed integrally with the shank portion and adapted to abut an end face of the main spindle, and an elastic member interposed between the flange portion and the sleeve, wherein the elastic member comprises a compressible element formed of an elastic material and a noncompressible element formed of a rigid material which are axially joined together with no clearance therebetween.

14. A tool holder as set forth in claim 13, wherein the elastic member is shaped annular as comprising a plurality of combinations of the compressible element and the noncompressible element, the combinations being joined together.

15. A tool holder as set forth in claim 13, wherein the elastic member is shaped annular as having an inner periphery abutting the outer periphery of the shank portion.

16. A tool holder as set forth in claim 13, further comprising preloading means for preloading the elastic member to make constant the distance between the sleeve and the flange portion in an assembled condition.

17. A tool holder as set forth in claim 14, wherein the elastic member is shaped annular as having an inner periphery abutting the outer periphery of the shank portion.

18. A tool holder as set forth in claim 14, further comprising preloading means for preloading the elastic member to make constant the distance between the sleeve and the flange portion in an assembled condition.

19. A tool holder comprising a sleeve to be fitted into a tapered bore of a main spindle of a machine tool, a shank portion inserted into the sleeve so as to be axially movable relative to the sleeve, a flange portion formed integrally with the shank portion and adapted to abut an end face of the main spindle, and an annular elastic member accommodated in an annular recess formed in the flange portion to press the sleeve axially, wherein the annular elastic member has outer and inner peripheries dimensioned, before the tool holder is inserted into the main spindle, to provide contact between an outer periphery of the shank portion of the annular recess and the inner periphery of the elastic member and to provide a clearance between the outer periphery of the elastic member and the outer periphery of the annular recess, respectively, the inner and outer peripheries of the annular elastic member adapted to abut the outer and inner peripheries of the annular recess, respectively, when the flange portion abuts the end face of the main spindle upon insertion of the tool holder in the tapered bore of the main spindle.

20. A tool holder comprising a sleeve to be fitted into a tapered bore of a main spindle of a machine tool, a shank portion inserted into the sleeve so as to be axially movable relative to the sleeve, a flange portion formed integrally with the shank portion and adapted to abut an end face of the main spindle, an annular elastic member accommodated in an annular recess formed in the flange portion to press the sleeve axially, and preloading means for annularly preloading the annular elastic member to make constant the distance between the sleeve and the flange portion in an assembled condition, wherein the annular elastic member has outer and inner peripheries adapted to abut the outer and inner peripheries of the annular recess, respectively, when the flange portion abuts the end face of the main spindle.

* * * * *